O. LONG.

PACKING FOR BOTTLES, &c.

No. 9,948. Reissued Nov. 29, 1881.

Witnesses:-

Louis M. Whitehead

Geo. Haynes

Inventor:

Oliver Long by his Attorneys

Brown & Brown

UNITED STATES PATENT OFFICE.

OLIVER LONG, OF NEW YORK, N. Y.

PACKING FOR BOTTLES, &c.

SPECIFICATION forming part of Reissued Letters Patent No. 9,948, dated November 29, 1881.

Original No. 154,498, dated August 25, 1874. Application for reissue filed August 4, 1881.

*To all whom it may concern:*

Be it known that I, OLIVER LONG, of New York, in the county of New York and State of New York, have invented a certain new and useful Packing for Bottles, &c.; and I do hereby declare that the following is a full, clear, and exact description of the invention, such as will enable others skilled in the art to which it appertains to make and use it, reference being had to the accompanying drawings, which form part of this specification, in which—

Figure 1:
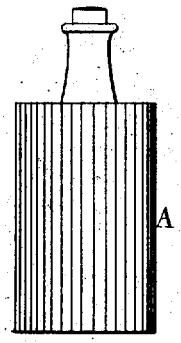
Figure 2:
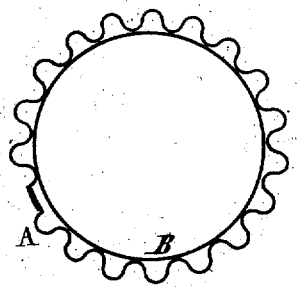
Figure 3:
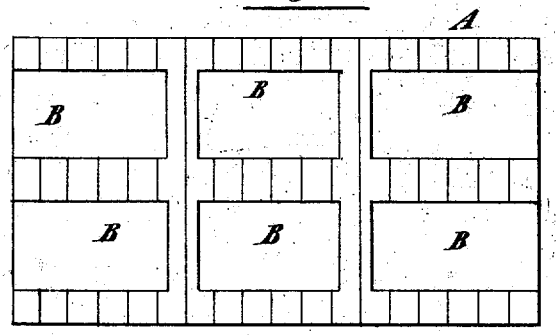

Figure 1 is a side view of my improved packing or envelope applied to a bottle. Fig. 2 is a top view of an envelope. Fig. 3 is a side view of a pad or open envelope.

The object of this invention is to provide a novel packing or pad for bottles, &c., which may be easily and cheaply made, and which will be safe, effective, easily applied, and durable.

The invention consists in the production, as a new article of manufacture, of a packing composed of a sheet of paper fluted to give it body and elasticity, and another sheet of paper secured to the former to retain it in place. The packing so made may be formed into envelopes, pads, or cells, according to its method of application or use, as hereinafter more fully set forth.

For the purposes of my invention I take paper of any suitable quality, and first size it on one side, allow the sizing to dry, and then dampen the other side with water and pass it through a machine previously heated, whereby it is fluted, crimped, or embossed. I then pass it over a heated surface, such as a steam or gas heated table or cylinder, which contracts the flutings, giving them stiffness and greater strength, and rendering them permanently elastic. I next, according to requirements, paste, glue, or otherwise attach to the fluted paper, strips or sheets of plain paper on one or both sides. After all is dry I cut the packing material into the required lengths for envelopes, pads, cells, or other forms of packing. The strips or sheets of plain paper, when attached, serve to retain the other sheets in form after being fluted, crimped, or embossed.

In forming envelopes for bottles I unite the edges of the fluted paper by eyelets, or by adhesive materials, and in some cases apply a bottom pad to the same paper.

For claret-bottles, &c., I intend that the packing shall surround the neck of the bottles, and suggest the propriety of arranging around the inside of the case strips or pads to protect the shoulders of the bottles.

For pads I cut up the completed paper in lengths according to the size of the bottles or articles, and so arrange them as to protect the articles from each other, and preserve them from contact with the sides, top, and bottom of the package or casing.

In the accompanying drawings, illustrating my invention, Figs. 1 and 2 represent a bottle-envelope. A designates a sheet of fluted paper, and B designates a strip or sheet of like material for retaining the sheet A in form. Fig. 3 represents a pad consisting of a sheet of fluted or crimped paper A, and strips of plain paper B applied to prevent the fluting from flattening or expanding.

Where breakage or leakage is to be greatly apprehended, or where otherwise the packing is liable to exposure or moisture, water-proof paper may, to great advantage, be employed.

I do not claim, broadly, the invention of fluted paper; but

What I claim as new, and desire to secure by Letters Patent, is—

As a new article of manufacture, a packing composed of a sheet of paper, fluted or crimped to give it body and elasticity, and another sheet secured to the former to retain it in place.

OLIVER LONG.

Witnesses:

T. J. KEANE,

A. C. WEBB.